Patented Aug. 15, 1933

1,922,510

UNITED STATES PATENT OFFICE 1,922,510

FOAM STABILIZER

George Gordon Urquhart, Cynwyd, and Aaron Conrad Jones, Conshohocken, Pa., assignors to American Fomon Company, Philadelphia, Pa., a Corporation of New Jersey No Drawing. Application April 8, 1929
Serial No. 353,676

8 Claims. (Cl. 23—11)

Our invention is designed to provide an improved stabilizing agent for foam forming compositions such as are used for smothering fire. The leading object of our invention is the production of an inexpensive stabilizer which is readily soluble in water and which when combined with suitable effervescing chemicals, will produce a tenacious mobile non-staining foam of white or light color.

Our improved stabilizer comprises a leguminous extract preferably made by the digestion of roasted peanut shells with an alkali solution. The extract may be used in liquid form, but for convenience of storage, transportation and compounding is preferably evaporated and dried to a powder. Such powder flows freely, is readily soluble in cold or hot water, and does not ferment or deteriorate. The stabilizer is inert relatively to the gas forming or effervescent chemicals and may be combined with either of them before introduction into the solvent or may be fed into the solvent separately. The ready solubility and free flowing qualities of our powdered stabilizer make it particularly suitable for use where foam is formed by introducing the effervescent chemicals, such as bicarbonate of soda and aluminum sulphate, into a flowing stream of water by suction created thereby in its passage through a foam generator. Our improved stabilizer may, however, be satisfactorily used, in either liquid or powdered form, as a part of the charge of portable extinguishers or in a tank farm solution system.

Large quantities of roasted peanut shells are ordinarily available as a waste product at little or no cost and this fact as well as the facility with which they may be digested, the high percentage of yield, and the excellence, color and non-straining characteristics of the product make roasted peanut shells preferable to the husks of other legumes, which may, however, be used.

In the preparation of our improved stabilizer, the roasted peanut shells or hulls, together with any discarded peanut shells or hulls, together with any discarded peanut kernels or peanut vines which may be mixed with the shells, may be shredded and charged into a vertical extraction cylinder and mixed therein with approximately 10% of commercial caustic soda. Warm water, or the wash water from a previously treated batch of shells, is then introduced into the cylinder and dissolves the soda. The cylinder is then closed and water at a temperature of approximately 290° F. is forced into the cylinder at a pressure of approximately 60 pounds per square inch, the air in the cylinder being vented therefrom. Approximately 800 gallons of solution is used for each thousand pounds of shells and the mixture is cooked for approximately an hour and a half with occasional agitation by the injection of steam, which also serves to keep up the temperature.

When the charge has been sufficiently cooked, the liquor is withdrawn and boiled down from about 5% solid contents to about 40% solid contents. If desired, the stabilizer may be fortified by the addition to the boiled extract of minute quantities of borax, sodium resinate, benzoate of soda or para-formaldehyde.

The stabilizer may be used in liquid form but is preferably dried to a cake in a suitable vacuum drier and the cake ground to a crystalline powder of approximately 40 mesh.

The proportions of the stabilizer to be used will vary with the foaming ingredients used therewith and the kind of foam desired. By using approximately 3 ounces of the powdered extract, 22 ounces of bicarbonate of soda and 30 ounces of aluminum sulphate and combining these ingredients with a suitable volume of solvent, preferably approximately one pound of powder to one gallon of water, a stiff, tenacious foam will be produced which has great mobility, may be conveyed through conduits with but little deterioration, does not stain or discolor materials with which it comes in contact, and which owing to its light color, is readily visible so that it can be determined whether it is being projected to the right spot.

The dry powdered extract is preferably combined with the bicarbonate of soda and this mixture is preferably fed separately from the aluminum sulphate into a stream of water flowing through a hose or pipe. The powder may be introduced into the water by means of an ejector or ejectors creating sufficient suction to draw the powders into the running stream in proper proportions or by mechanical feeders. The powders are dissolved by contact with the water in the hose or pipe to form foam which is ejected from the nozzle.

Having described our invention, we claim:

1. A foam stabilizer comprising a leguminous extract in combination with foam producing substances.

2. A foam stabilizer comprising a peanut extract in combination with foam producing substances.

3. A foam stabilizer comprising an extract of peanut shells and sodium resinate.

4. A fire extinguishing agent comprising extract of peanut shells and foam producing ingredients.

5. A fire extinguishing agent comprising extract of peanut shells, bicarbonate of soda and aluminum sulphate.

6. A foam having as its continuous phase a liquid containing a leguminous extract.

7. A foam having as its continuous phase a liquid containing an extract of roasted peanut shells.

8. The combination with foaming agents of an extract of roasted peanut shells.

GEORGE GORDON URQUHART.
A. CONRAD JONES.